United States Patent
Bijpost et al.

(10) Patent No.: US 8,084,642 B2
(45) Date of Patent: Dec. 27, 2011

(54) METHOD OF IMPROVING THE CRUSHING STRENGTH, IMPACT RESISTANCE AND COMPRESSIBILITY OF UREA, AND UREA COMPOSITION

(75) Inventors: Erik Bijpost, Nieuwegein (NL); Luc Vanmarcke, Lembeke (BE); John van der Hoeven, Breukelen (NL); Ruud van Belzen, Middelburg (NL)

(73) Assignee: Yara International ASA, Oslo (NO)

( * ) Notice: Subject to any disclaimer, the term of this patent is extended or adjusted under 35 U.S.C. 154(b) by 496 days.

(21) Appl. No.: 10/574,815

(22) PCT Filed: Oct. 6, 2003

(86) PCT No.: PCT/EP03/11070
§ 371 (c)(1), (2), (4) Date: Jun. 30, 2006

(87) PCT Pub. No.: WO2005/040069
PCT Pub. Date: May 6, 2005

(65) Prior Publication Data
US 2007/0131011 A1   Jun. 14, 2007

(51) Int. Cl.
*C07C 273/02* (2006.01)
*C05C 9/00* (2006.01)
*C07C 211/00* (2006.01)

(52) U.S. Cl. .............................................. 564/63; 71/28
(58) Field of Classification Search ................ 71/18, 28; 564/1, 63
See application file for complete search history.

(56) References Cited

U.S. PATENT DOCUMENTS

| 4,063,919 | A | 12/1977 | Grano, Jr. |
| 5,462,981 | A | 10/1995 | Bastioli et al. |
| 6,217,630 | B1 * | 4/2001 | Chanen et al. .................... 71/28 |

FOREIGN PATENT DOCUMENTS

| WO | 93/09171 | 5/1993 |
| WO | 02/20471 | 3/2002 |

OTHER PUBLICATIONS

Polyol entry. Meriam-Webster Dictionary. http://medical.merriam-webster.com/medical/polyol.*
English abstract of RU 2166515, published May 10, 2001.

* cited by examiner

*Primary Examiner* — Stanley Silverman
*Assistant Examiner* — Richard M Rump
(74) *Attorney, Agent, or Firm* — Wenderoth, Lind & Ponack, L.L.P.

(57) ABSTRACT

A method of improving the crushing strength, impact resistance and the compressibility of urea granules by the addition of a compound to the molten urea, wherein the compound comprises both a polyvinyl compound and an organic molecule consisting of 1-10 carbon atoms and 1-10 polar organic groups.

13 Claims, No Drawings

METHOD OF IMPROVING THE CRUSHING STRENGTH, IMPACT RESISTANCE AND COMPRESSIBILITY OF UREA, AND UREA COMPOSITION

The invention relates to a method of improving the crushing strength, impact resistance and the compressibility of urea granules by the addition of a composition to the urea.

It is generally known that urea granulates are subject to crushing during production, storage and transport. Up to 25 wt % of the urea granulate may be crushed if the urea fertilizer is moved into a storage tank or storage ship at a relatively high temperature of e.g. more than 40° C. Even though the urea granulate as such hardly absorb any moisture and are virtually non-susceptible to caking, high percentages of crushed granules do lead to dust problems with a strong caking tendency.

It is also known that a number of chemical compositions can be used as an additive to improve the crushing strength, the caking tendency and the resistance to moisture. Formaldehyde, hexamethylenetetramine and formaldehyde/urea condensate products are applied as crushing strength improvers, while the combination poly(vinylacetate)/surfactant (U.S. Pat. No. 4,812,158) is used to reduce the caking tendency. All these additives must either be added in relatively large quantities, or the toxic characteristics make them difficult to handle. Moreover, the use of a surface active component as in poly(vinylacetate)/surfactant, results in increased foaming when the urea is used for industrial applications, such as resin production, whilst formaldehyde derivatives are unsuitable in the case of melamine production. There is also a major difference with respect to the use of additives. Both formaldehyde derivatives and the compositions according to the invention are admixed to a urea melt. The combination polyvinylacetate/surfactant is, however, sprayed onto a preformed granule.

GB-A-1217106 describes a method of reducing the caking of urea by using a poly(vinylalcohol) having a high molecular weight as an anticaking additive. More in particular, according to this method, an aqueous solution of the additive is admixed to an aqueous solution of urea. Preferentially, an amount of additive of from 0.005 to 5 wt %, based on the weight of the urea, is admixed. The concentration of the aqueous urea solution is initially 80%, according to the example given; after admixture of the solution of the additive, concentration up to 95% takes place at elevated temperature, after which the urea is allowed to crystallize by cooling.

Patent WO 02/20471 discloses a method in which a combination of a polyvinyl compound and inorganic salts is admixed with a urea melt. Both the crushing strength and the impact resistance of the resulting granulate appeared to be improved compared to untreated urea. In addition, the compressibility of the urea was found to be decreased substantially. The latter observation can be a great advantage as the urea granulates will be less prone to deformation upon storage. However, the introduction of inorganic salts, such as aluminium sulphate, in urea results in a strong decrease of the pH upon dissolving the urea in water. This can be a big disadvantage when using urea for technical applications, such as the production of resins.

It is therefore an object of the invention to provide a method by means of which urea having improved crushing strength and impact resistance as well as a low compressibility is obtained and by means of which the abovementioned drawbacks are overcome.

It has been found that the addition of a composition comprising both a polyvinyl compound and an organic molecule consisting of 1-10 carbon atoms and 1-10 polar organic groups to the urea melt leads to an improvement of both the hardness and the compressibility of the urea granules formed. The organic components can be added either separately to the molten urea or together with the aqueous solution of the polyvinyl compound. According to a preferred embodiment, the total added amount of small organic molecules is at most 10% by weight based on the total amount of urea. The present application relates to an intimate mixture of urea, a polyvinyl compound and small molecules containing hydroxyl groups, resulting in increased hardness and decreased compressibility of the composition compared to untreated urea. Preferably the polyvinyl compound is a polyvinylalcohol, whereas the preferred small polar organic molecule was found to be pentaerythritol.

To demonstrate the effect of the invention, a number of experiments were carried out, employing methods which are representative for production and for testing the quality of the urea granules produced.

Urea prills were prepared by mixing a urea melt with an aqueous solution of the additive (of the concentrations specified in the experiments). The urea prills were formed by allowing molten urea droplets to descend in aliphatic oil having a viscosity of from 10 to 50 centipoise at 80° C. After crystallization the prills were taken from the oil and washed with chloroform to remove the oil. The prills were sieved in order to obtain a particular size. The prills were dried in a fluidized bed for 1 hour at about 40° C. They were collected and kept In an airtight flask until both the crushing strength and the impact resistance were measured.

Urea pellets were produced by admixing an aqueous solution of the additive (having the concentrations indicated in the experiments) with a urea melt consisting of 99.7 w/w % urea and 0.3 w/w % water. Thereafter the urea pellets were formed by allowing the molten urea droplets to fall separately from a height of 1 cm onto a glass plate. After solidification the pellets were scraped from the glass plate and the fines where removed by means of a sieve. The pellets were collected and kept in an airtight bottle until the compressibility was measured.

The crushing strength was determined via the IFDC S-115 method. The impact resistance was measured via the IFDC S-118 method.

The compressibility was determined as follows. A transparent round tube having an inner diameter of 3 cm was filled with 40 g urea pellets at room temperature. Onto this a plunger was brought, through which a pressure of about 600 kPa was exerted onto the sample. Directly after the application of the overpressure and again after 24 hours the height of the urea column was measured. The relative difference in height, which is a measure for the compressibility, was calculated from these two values (height (%)).

Experiment 1

A wide range of small polar organic molecules have been mixed with polyvinylalcohol and added to the urea melt following the procedure as mentioned above.

| Additive | Crushing Strength (N) | Impact Resistance (% fracture) | Compressibility (ΔHeight, %) |
| --- | --- | --- | --- |
| Blank urea | 13 | 75 | 16 |
| 1000 ppm of a 12 wt % PVA (>99% hydrolyzed) in $H_2O$ | 18 | 30 | 11 |
| 1000 ppm of a 12 wt % PVA and 1 m/m % Glycol solution in $H_2O$ | 21 | 35 | 9 |

-continued

| Additive | Crushing Strength (N) | Impact Resistance (% fracture) | Compressibility (ΔHeight, %) |
|---|---|---|---|
| 1000 ppm of a 12 wt % PVA and 1 m/m % Glycerol solution in H$_2$O | 21 | 32 | 9 |
| 1000 ppm of a 12 wt % PVA and 1 m/m % 1,4-butaandiol solution in H$_2$O | 18 | 36 | 10 |
| 1000 ppm of a 12 wt % PVA and 1 m/m % dimethylolurea solution in H$_2$O | 21 | 29 | 8 |
| 1000 ppm of a 12 wt % PVA and 1 m/m % pentaerythritol solution in H$_2$O | 20 | 19 | 3 |
| 1000 ppm of a 12 wt % PVA and 1 m/m % bishydroxymethylpropionic acid solution in H$_2$O | 19 | 32 | 4 |
| 1000 ppm of a 12 wt % PVA and 1 m/m % tartaric acid solution in H$_2$O | 17 | 39 | 5 |
| 1000 ppm of a 12 wt % PVA and 1 m/m % citric acid solution in H$_2$O | 14 | 46 | 9 |
| 1000 ppm of a 12 wt % PVA and 1 m/m % lactic acid solution in H$_2$O | 16 | 55 | 7 |
| 1000 ppm of a 12 wt % PVA and 1 m/m % succinic acid solution in H$_2$O | 15 | 50 | 6 |
| 1000 ppm of a 12 wt % PVA and 1 m/m % gluconic acid solution in H$_2$O | 14 | 49 | 9 |

This experiment shows that both the hardness and the compressibility of urea granulates improved upon addition of a polyvinyl compound and small polar organic molecules. From these polar components pentaerythritol was found to give the most profound effect.

Experiment 2

In order to select the best performing polyvinyl compound, different polymers were added to the urea melt in combination with pentaerythritol.

| Additive | Crushing Strength (N) | Impact Resistance (% fracture) | Compressibility (ΔHeight, %) |
|---|---|---|---|
| Blank urea | 13 | 75 | 16 |
| 1000 ppm of a 12 wt % PVA (>99% hydrolyzed) in H$_2$O | 18 | 30 | 11 |
| 1000 ppm of a 12 wt % PVA (>99% hydrolyzed) and 1 wt % pentaerythritol solution in H$_2$O | 20 | 19 | 3 |
| 1000 ppm of a 12 wt % PVA (83% hydrolyzed) in H$_2$O | 19 | 28 | 9 |
| 1000 ppm of a 12 wt % PVA (83% hydrolyzed) and 1 wt % pentaerythritol solution in H$_2$O | 19 | 19 | 4 |
| 1000 ppm of a 12 wt % polymaleic acid solution in H$_2$O | 15 | 60 | 14 |
| 1000 ppm of a 12 wt % polymaleic acid and 1 wt % pentaerythritol solution in H$_2$O | 17 | 51 | 9 |

This experiment demonstrates that the addition of a combination of polyvinyl compound and pentaerythritol to a urea melt results in urea granulate with low compressibility and good hardness. The best performance was obtained when using a combination of polyvinylalcohol and pentaerythritol.

Experiment 3

In order to find the optimum ratio between the polyvinyl compound and the small polar organic compound, pentaerythritol was mixed with polyvinylalcohol in different ratios and added to the urea melt.

| Additive | Crushing Strength (N) | Impact Resistance (% fracture) | Compressibility (ΔHeight, %) |
|---|---|---|---|
| Blank urea | 13 | 75 | 16 |
| 1000 ppm of a 12 wt % PVA in H$_2$O | 18 | 30 | 11 |
| 1000 ppm of a 12 wt % PVA and 0.1 m/m % pentaerythritol solution in H$_2$O | 20 | 28 | 8 |
| 1000 ppm of a 12 wt % PVA and 0.5 m/m % pentaerythritol solution in H$_2$O | 21 | 25 | 5 |
| 1000 ppm of a 12 wt % PVA and 1.0 m/m % pentaerythritol solution in H$_2$O | 20 | 19 | 3 |
| 1000 ppm of a 12 wt % PVA and 1.5 m/m % pentaerythritol solution in H$_2$O | 19 | 21 | 3 |
| 1000 ppm of a 12 wt % PVA and 2.0 m/m % pentaerythritol solution in H$_2$O | 20 | 23 | 4 |
| 1000 ppm of a 12 wt % PVA and 3.0 m/m % pentaerythritol solution in H$_2$O | 18 | 26 | 6 |
| 1000 ppm of a 12 wt % PVA and 5.0 m/m % pentaerythritol solution in H$_2$O | 18 | 30 | 7 |

When starting with 12 m/m % polyvinylalcohol, the best results are achieved in the presence of 0.5 to 1.5 m/m % pentaerythritol.

Experiment 4

To determine the optimum dosage level for the optimum mixture of experiment 3, different amounts of this mixture were added to the urea melt.

| Additive | Crushing Strength (N) | Impact Resistance (% fracture) | Compressibility (ΔHeight, %) |
|---|---|---|---|
| Blank urea | 13 | 75 | 16 |
| 500 ppm of a 12 wt % PVA and 1.0 wt % pentaerythritol solution in H$_2$O | 12 | 57 | 16 |
| 750 ppm of a 12 wt % PVA and 1.0 wt % pentaerythritol solution in H$_2$O | 15 | 42 | 9 |
| 1000 ppm of a 12 wt % PVA and 1.0 wt % pentaerythritol solution in H$_2$O | 20 | 19 | 3 |
| 1250 ppm of a 12 wt % PVA and 1.0 wt % pentaerythritol solution in H$_2$O | 21 | 24 | 4 |
| 1500 ppm of a 12 wt % PVA and 1.0 wt % pentaerythritol solution in H$_2$O | 20 | 21 | 4 |
| 2000 ppm of a 12 wt % PVA and 1.0 wt % pentaerythritol solution in H$_2$O | 19 | 27 | 5 |
| 3000 ppm of a 12 wt % PVA and 1.0 wt % pentaerythritol solution in H$_2$O | 20 | 32 | 8 |

This experiment shows that the optimum dosage of a mixture comprising polyvinylalcohol and pentaerythritol is between 750 and 1500 ppm by weight of urea to the urea melt.

The invention claimed is:

1. A method of improving the crushing strength, impact resistance and compressibility of urea granules, comprising adding to molten urea, both
a polyvinyl compound, and
an organic compound having 2-6 carbon atoms and 1-10 polar organic groups, wherein the polar organic groups are selected from the group consisting of hydroxyl, amine and amide groups, and the amount of the organic compound in total is at most 1 wt %, based on the amount of molten urea.

2. The method according to claim 1, wherein the organic compound has between 2 and 5 carbon atoms.

3. The method according to claim 1, wherein the organic compound is pentaerythritol.

4. The method according to claim 1, wherein the amount of the organic compound to be added in total is between 5 and 100 ppm, based on the amount of molten urea.

5. The method according to claim 1, wherein the polyvinyl compound is of the general formula $(CHX—CHY)_n$, where n=4-10,000 and X and Y independently of one another are selected from the group consisting of a hydrogen atom and a polar organic group.

6. The method according to claim 5, wherein X is a hydrogen atom and Y consists of a hydroxyl group.

7. The method according to claim 5, wherein at least 70% of Y consists of a hydroxyl group.

8. The method according to claim 1, wherein the polyvinyl compound and the organic compound are added to the molten urea as an aqueous solution having a total additive concentration of from 0.5 to 25 wt %.

9. The method according to claim 1, wherein the polyvinyl compound and the organic compound are added to the molten urea as an aqueous solution having a total additive concentration of from 1 to 20 wt %.

10. The method according to claim 1, wherein the polyvinyl compound and the organic compound are added to the molten urea as an aqueous solution having a total additive concentration of from 100 to 10,000 ppm.

11. The method according to claim 10, wherein the concentration of the total of the polyvinyl compound and organic compound is from 500 to 3,000 ppm.

12. The method according to claim 7, wherein at least 95% of Y consists of a hydroxyl group.

13. The method according to claim 1, wherein the organic compound is selected from the group consisting of glycol, glycerol, 1,4-butanediol, dimethylolurea, pentaerythritol, bishydroxymethylpropionic acid, tartaric acid, citric acid, lactic acid, succinic acid and gluconic acid.

* * * * *